United States Patent [19]

Barbett

[11] Patent Number: 5,007,197
[45] Date of Patent: Apr. 16, 1991

[54] TERMITE CONTROL SYSTEM

[76] Inventor: Betty G. Barbett, P.O. Box 366, Barbers Point, Hi. 96862-0366

[21] Appl. No.: 417,066

[22] Filed: Oct. 4, 1989

[51] Int. Cl.⁵ .............................................. A01M 1/24
[52] U.S. Cl. ...................................................... 43/124
[58] Field of Search ........................................ 43/124

[56] References Cited

U.S. PATENT DOCUMENTS

| | | | |
|---|---|---|---|
| 2,842,892 | 7/1958 | Aldridge et al. | 43/124 |
| 2,899,771 | 8/1959 | Burris | 43/124 |
| 2,915,848 | 12/1959 | Griffin . | |
| 2,981,025 | 4/1961 | Woodson . | |
| 3,151,746 | 10/1964 | Reustle et al. | 43/124 |
| 3,209,485 | 10/1965 | Griffin . | |
| 3,513,586 | 10/1968 | Meyer et al. . | |
| 3,602,248 | 8/1971 | Peacock | 43/124 |
| 3,782,026 | 1/1974 | Bridges et al. . | |
| 3,909,975 | 10/1975 | Basile | 43/124 |
| 4,028,841 | 6/1977 | Lundwall . | |
| 4,246,936 | 1/1981 | Luz et al. . | |
| 4,297,055 | 10/1981 | Peacock . | |
| 4,625,474 | 12/1986 | Peacock et al. . | |
| 4,626,130 | 12/1986 | Chapin . | |
| 4,742,641 | 5/1988 | Cretti | 43/124 |

Primary Examiner—Kurt Rowan
Attorney, Agent, or Firm—James Creighton Wray

[57] ABSTRACT

A method and apparatus of termite treatment, comprising first determining proper spacing for the drip tubing by using a sample of the drip tubing on compacted soil in a slab area to determine rate of water movement into the soil. Then based on this predetermined distance, the drip tubing is placed on top of the soil with openings of the tubing facing downward. The first and second ends of this tubing are exposed and extend outward from the slab area. This tubing is covered with sand, the sand is then covered with a vapor barrier, and this vapor barrier is covered with gravel. Cement is the poured on top of the gravel and vapor barrier, thereby forming a slab. The insecticide is released through the drip tubing into the soil beneath the slab.

11 Claims, 2 Drawing Sheets

TERMITE CONTROL SYSTEM

BACKGROUND OF THE INVENTION

The invention concerns the controlling of termites in building construction. Termites, insects of the order isoptera, have about 2,000 species, about 200 of which are known to be pests and cause damage to crops, buildings and furniture. Termite distribution is primarily tropical. They are also prevalent in the subtropics and temperate zones. In North American they reach as far north as Maine and Vancouver.

The present invention is directed to subterranean dwelling species, which are dependent on moisture in the soil and which reach and destroy buildings and furnishings through foundations, either by wood in contact with the soil, or by cracks in slabs and foundations. Termite nymphs divide into worker, soldier and alates or reproductors. New colonies are established by winged adults who are weak flyers, often blown in the wind for a few yards or hundreds of feet. They alight, shed their wings, pair and nest in soft wood or soil. The nests are sealed to preserve moisture. A first batch of eggs is laid, and in two to five years a colony matures. The queen may become as large as four inches long, laying more than 30,000 eggs a day during a lifetime, which may stretch over 20 or more years. The tendency of colonies to establish close to each other and the rapid development of established colonies cause the species to become extremely destructive. The termites are equipped with mouth parts for chewing wood, and their guts contain protozoans for dissolving wood. Once colonies are well established, it is difficult to destroy them.

Many systems have been devised for destroying wood dwelling termites. The most satisfactory may be expensive and difficult fumigations. Subterreanean termites are mostly attacked by poisoning the ground before construction and by filling a trench around a construction with chemicals, usually chlorinated hydrocarbons. Some below-the-ground pipe systems have been proposed, which install rigid pipes beneath the surface of the ground, especially beneath vertical walls. Insecticides are periodically released from the pipes.

Many problems remain with termite control. Foremost of the problems is the need to control termites with a minimal level of chemicals so that the chemicals do not migrate to ground water and cause long-term pollution. Another problem that exists is the distribution of termite control chemicals in a suitable manner to ensure destruction of all the termites without overloading a ground system with the chemicals. Problems exist in ensuring against penetrations of slabs and foundations by unobserved cracks.

SUMMARY OF THE INVENTION

The present invention seeks to overcome the problems of the prior art by providing precise termite protection control.

The present system very carefully lays out a complete grid of pipes beneath the slab to ensure that all of the soil beneath the slab is repeatedly treated. The present system uses pressure compensating drip lines to ensure complete and uniform wetting of the compacted ground.

A pressure compensating drip pipe network is laid before and below the foundation of a building. The network is covered by a layer of sand, a vapor barrier and a layer of gravel before a slab is poured. A termite control substance is flows through the pipes and effectively eliminates and controls termite infestation. A uniform pressure compensation dripper evenly distributes the controlling liquid, and a vapor barrier outside the system stops leaching of the chemicals into water supplies.

The preferred installation procedure is as follows:

Determine the proper spacing to use for the tubing spacing. This will be done by using a sample of the tubing on the compacted soil to determine the rate of water movement to make sure that all areas receive equal treatment. Prewetting of the compacted soil may be required in some cases to assure that all areas receive equal treatment. If this is required, the system would be fed water only for a predetermined time prior to chemical injection.

Lay out the tubing as shown based on the spacing determination from the above step. Note that the tubing will be secured with wire clips every 4 feet.

Finish the installation as shown, ascertaining that the two ends of the tubing are well secured.

A root inhibitor physically surrounds the slab, extends downward about 18 inches and prevents growth of roots under the slab. Preferred inhibitors have timed release capsules which release chemicals into the soil and turn roots away from under the slab, adding sand, barrier, gravel and concrete.

From the first step, apply enough water only through the system for prewetting if required.

Pump the required amount of chemical mix through the system to treat the calculated square footage.

Re-treat the slab as required and per the chemical label.

A preferred method of termite treatment includes determining proper spacing for drip tubing by a using a sample of the tubing on compacted soil in a slab area to determine rate of water movement into the soil. Pressure-compensating drip tubing is laid on top of the soil with openings in the tubing facing downward. Lengths of the tubing are spaced at predetermined distances according to the rate of water movement. First and second ends of the tubing extend outward from the slab are. The tubing is covered with sand. The sand is covered with a vapor barrier, and the vapor barrier with gravel. Cement is poured on top of the gravel and the vapor barrier, thereby forming a slab. Insecticide is released through the drip tubing into the soil beneath the slab.

Preferably releasing the insecticide comprises pumping water into the tubing and prewetting the compacted soil, and then pumping a pesticide chemical mix through the tubing and releasing the pesticide chemical mix from the tubing to the compacted soil.

The preferred method includes periodically retreating the soil by pumping water and pesticide chemical mix through the tubing.

A pressure gauge is connected to a first end of the tubing, and an injector and pressure gauge are connected to the second end of the tubing, before injecting water and pesticide into the second end of the tubing, while observing the pressure at the second and first ends of the tubing.

The method includes flowing termite control substance through the tubing under pressure, dripping the termite control substance from the tubing, wetting the entire compacted soil with the termite control substance dripping from the tubing, and removing the pressure from the tubing.

Preferred termite control slab apparatus includes a pressure compensating drip line tubing laid in a sinusoidal pattern on compacted soil with drip openings on the bottom of the tubing facing the compacted soil. A layer of sand covers the tubing and the compacted soil. A vapor barrier covers the layer of sand; a layer of gravel covers the vapor barrier. Concrete covers the gravel and vapor barrier, and first and second ends of the tubing extend from beneath the concrete slab.

Preferably first and second tubing connector boxes are positioned at first and second ends of the tubing. First and second quick connectors are mounted in the boxes and are connected respectively to the first and second ends of the tubing. Spring-mounted caps are positioned on the first and second quick connectors.

A pressure gauge is mounted on a complementary quick connector for mounting in the second connector.

An injection hose has a quick connector injection connector for mounting in the first quick connector in the first box.

The preferred termite control apparatus includes a pressure compensating drip line tubing laid in a sinusoidal pattern on compacted soil with drip openings on the bottom of the tubing facing the compacted soil.

Other advantages and features of the invention will be apparent from the disclosure, which includes the above and ongoing specification with the claims and the drawings.

DETAILED DESCRIPTION OF THE DRAWINGS

Figure 1:
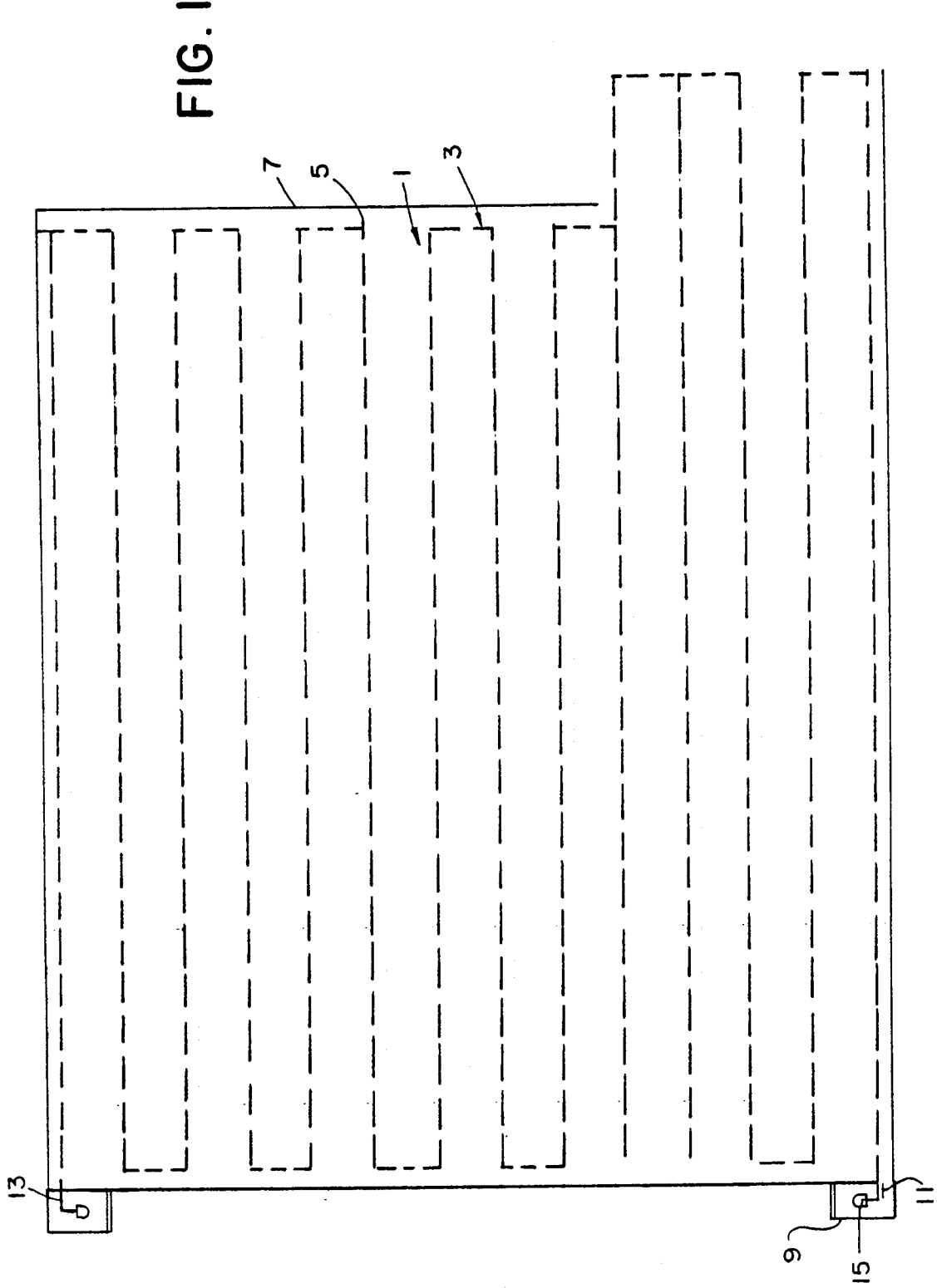
FIG. 1 is a plan view of a preferred system of the invention.

Referring to FIG. 1, a termite control system is generally indicated by the numeral 1. A serpentine pattern 3 of a pressure compensating dripper line tube 5 is laid beneath a slab 7 on a prepared surface. Standard water boxes 9 are provided at first and second ends 11 and 13 of the tube, and riser assemblies 15 are provided at each end.

Figure 2:
FIG. 2 is an elevation of the preferred system shown in FIG. 1.

As shown in FIG. 2, the pressure compensating tubing 5 is laid on a layer 21 of compacted soil. A layer of sand 23 is laid on top of the tubing 5 and the compacted soil 21, and a vapor barrier 25 is laid on top of the sand. A layer of gravel 27 is laid on top of the vapor layer, and the slab 7 is poured over the gravel layer. The water boxes 9 are set level with the finished grade, and the riser assemblies 15 are installed in the water boxes.

Figure 3:
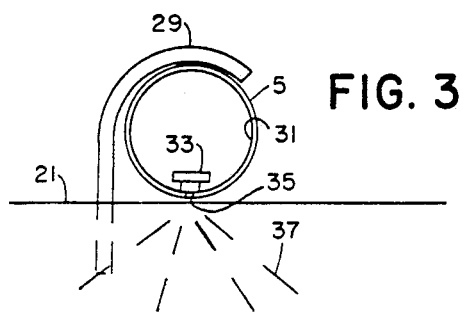
FIG. 3 is a detail of the securing of a preferred pressure compensating tubing.

As shown in FIG. 3, the preferred pressure compensating tubing 5 is secured along the compacted soil surface 21, with hooks 29 made of No. 6 wire or equivalent. Preferably the hooks are placed at about 4 ft intervals along the tube. The pressure compensating tubing 5 has an open central body 31, with internal emitters 33 which release water through openings 35 at the bottom of the tubing so that the water flows 37 into the soil, dampening all of the soil without eroding the soil or backing up or causing excess chemicals or water to flow into particular parts of the soil.

Figure 4:
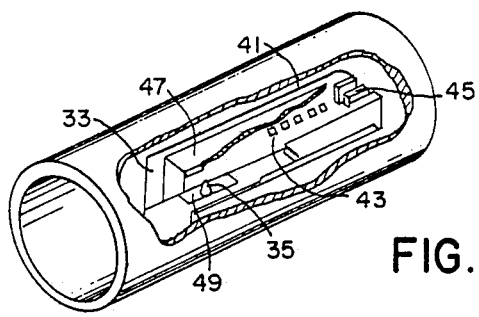
FIG. 4 is a detail of a preferred pressure compensating tubing used with the present invention.

As shown in FIG. 4, the emitter 33 within the preferred pressure compensating tubing 5 has a body 41 which is formed with a labyrinth 43, and a filter 45 at one end leading to the labyrinth. A membrane 47 covers the filter and labyrinth and allows water to drip downward through an elongated opening 49 into the small circular opening 35 in the bottom of the pressure compensating dripper line tube 5. One preferred tubing is made by Netafim Irrigation, Inc. of Valley Stream, N.Y. and is called a RAM multi-seasonal pressure compensating dripper line. The RAM dripper line is intended for agricultural use for the drip irrigation of field crops, orchards and vegetables. A preferred tube has a diameter of about ½ inch. A dripper body is adhered to the inside of the tubing, and the dripper body may have a length of about 1 ½ inches, a height of about ¼ inch, and a width about 4/10 inch. A preferred tubing may have dripper discharges bodies and opening centered on about 18 inch centers, each of which openings may have a discharge rate of about 0.32 gallons per hour at a pressure between 15 and 45 pounds per square inch.

It is preferred to lay the tubing in sinusoidal flights spaced on about 18 inch centers, with ends spaced about 6 inches from the edges of the slabs. Spray openings are arranged along the tubing at about 18 inch centers.

Figure 5:
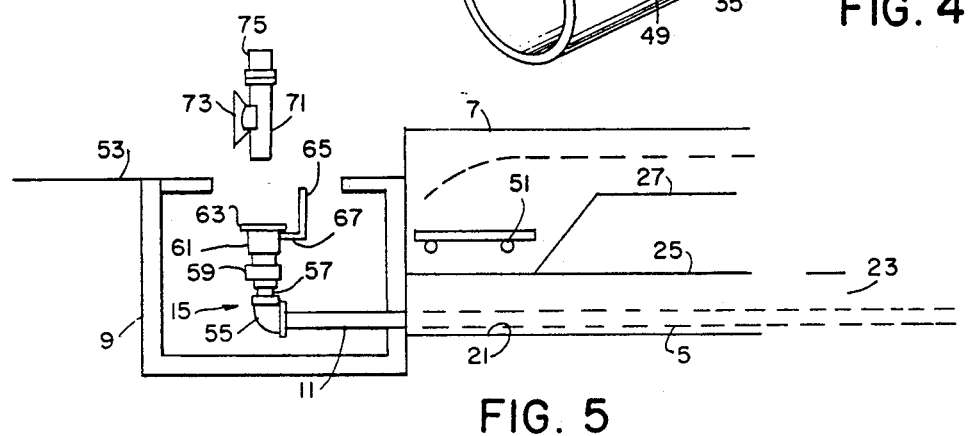
FIG. 5 is a detail of the elevation shown in FIG. 2.

As shown in FIG. 5, the concrete slab has reinforcing bars 51 positioned around the peripheral portions of the slab and across the surface of the slab above the gravel layer 27. The tubing 5 is buried in the sand 23 above the compacted soil level 21. Opposite ends 11 of the tubing extend outward from the slab 7 into water boxes 9, which are mounted at the sides of the slab flush with the finish grade 53. Each end fitting 15 which is mounted in a water box 9 has an elbow 55, a nipple 57, a step-up coupling 59 and a bayonet-type equipped coupler 61. The coupler 61 has a lip 63 and a cover 65 which is hinged to an extension 67 from the lip. The cover 65 remains in place over the lip 63 during most of the life of the termite control system 1. Periodically, an injector coupling 71 is inserted in the coupler 61. A spring-mounted clamp 73 engages the lip 63 and holds the injection nozzle 71 within the injection coupling 61. An injection hose 75 is connected to a source of water and chemicals with an injection pressure gauge.

Figure 6:
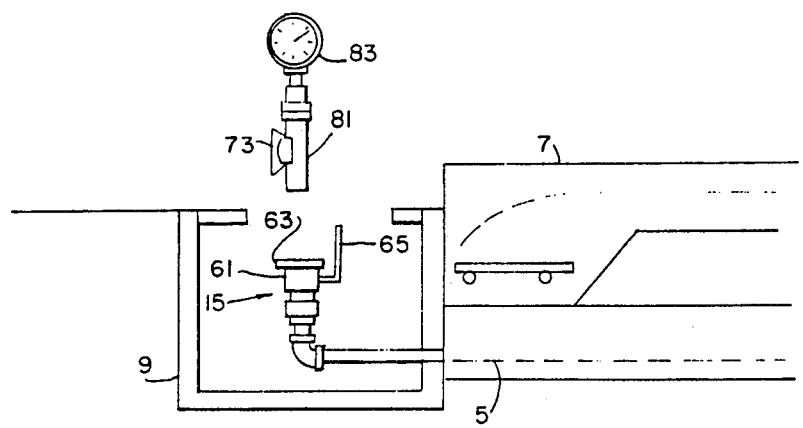
FIG. 6 is a detail of an elevation showing a second end of the pressure compensating tubing in a second water box at the side of the slab.

As shown in FIG. 6, similar elements have similar numbers. A pressure gauge coupling nozzle 81 has a spring-loaded retaining clip 73, which connected to lip 63 of the coupling 61. A pressure gauge 83 is mounted on the nozzle-type coupling 81 to register the pressure at the opposite end of the tubing while the injector is connected to the first end of the tubing.

In a preferred form of the invention, the 18 inch spacing of the flights of the tubing may be altered after observing the soil wetting. It is found that an 18 inch spacing of tubing centers usually sufficient to wet the entire compacted soil.

In a preferred operation of the periodic soil treatment, which may occur once a year or more often, for example, twice a year in areas of serious termite infestations, the nozzle 71 of an injector hose is connected to the coupling 61. Water is supplied through the hose at pressure of about 15 to 20 pounds per square inch, depending on the length of the tubing under the slab, until a pressure of about 5 pounds per inch or more is noted in the gauge 83. The water is continually introduced to the dripper system 1 for a predetermined time sufficient to wet the entire soil. As soon as that predetermined time has been reached, chemicals are injected into the system for a second predetermined time. Thereafter the injection nozzle 71 and the pressure gauge nozzle 81 are withdrawn from the couplings 61, and the caps 65 are snapped downward into place.

While the invention has been described with reference to specific embodiments, modifications and variations of the invention may be constructed without departing from the scope of the invention, which is described in the following claims.

I claim:

1. The method of termite treatment comprising determining proper spacing for drip tubing by a using a sample of the tubing on compacted soil in a slab area to determine rate of water movement into the soil, laying pressure-compensating drip tubing on top of the soil with openings in the tubing facing downward, and spacing lengths of the tubing at predetermined distances according to the rate of water movement determination, leaving first and second ends of the tubing exposed and extending outward from the slab area, covering the tubing with sand, covering the sand with a vapor barrier, covering the vapor barrier with gravel and pouring cement on top of the gravel and vapor barrier, thereby forming a slab, and releasing insecticide through the drip tubing into the soil beneath the slab.

2. The method of claim 1, wherein releasing the insecticide comprises pumping water into the tubing and prewetting the compacted soil, pumping a pesticide chemical mix through the tubing and releasing the pesticide chemical mix from the tubing to the compacted soil.

3. The method of claim 2, further comprising periodically retreating the soil by pumping water and pesticide chemical mix through the tubing.

4. The method of claim 1, further comprising connecting a pressure gauge to a first end of the tubing and connecting an injector and pressure gauge to the second end of the tubing, and injecting water and pesticide into the second end of the tubing and observing the pressure at the second and first ends of the tubing.

5. The method of claim 1, further comprising connecting a pressure gauge to a first end of the tubing and connecting an injector to the second end of the tubing, injecting water into the tubing and observing the pressure in the pressure gauge and injecting pesticide into the water in the tubing under pressure and observing the pressure gauge.

6. The method of claim 1, further comprising flowing termite control substance through the tubing under pressure, dripping the termite control substance from the tubing, wetting the entire compacted soil with the termite control substance dripping from the tubing, and removing the pressure from the tubing.

7. Termite control slab apparatus comprising a pressure compensating drip line tubing laid in a sinusoidal pattern on compacted soil with drip openings on the bottom of the tubing facing the compacted soil layer of sand covering the tubing and the compacted soil, a vapor barrier covering the layer of sand, a layer of gravel covering the vapor barrier and concrete covering the gravel and vapor barrier, first and second ends of the tubing extending from beneath the concrete slab.

8. The apparatus of claim 7, further comprising first and second tubing connector boxes positioned at first and second ends of the tubing, and first and second quick connectors mounted in the boxes and connected respectively to the first and second ends of the tubing.

9. The apparatus of claim 8, further comprising springmounted caps on the first and second quick connectors.

10. The apparatus of claim 8, further comprising a pressure gauge mounted on a complementary quick connector for mounting in the second connector.

11. The apparatus of claim 8, further comprising a quick connector injection connector for mounting in the first quick connector in the first box.

* * * * *